United States Patent [19]

Kunz

[11] Patent Number: 4,969,972
[45] Date of Patent: * Nov. 13, 1990

[54] DEVICE FOR WELDING TUBULAR COMPONENTS OF THERMOPLASTIC MATERIAL

[75] Inventor: Peter Kunz, Schaffhausen, Switzerland

[73] Assignee: Georg Fischer AG, Schaffhausen, Switzerland

[*] Notice: The portion of the term of this patent subsequent to May 1, 2007 has been disclaimed.

[21] Appl. No.: 232,479

[22] Filed: Aug. 15, 1988

[30] Foreign Application Priority Data

Aug. 28, 1987 [CH] Switzerland ............ 3324/87

[51] Int. Cl.⁵ ............ B29C 65/26; B29C 65/18
[52] U.S. Cl. .................... 156/503; 156/156; 156/158; 156/304.2; 156/304.6; 156/502; 264/248
[58] Field of Search ........... 156/304.2, 304.6, 158, 156/156, 502, 503, 294; 264/248

[56] References Cited

U.S. PATENT DOCUMENTS

| | | | |
|---|---|---|---|
| 2,647,555 | 8/1953 | Hinman | 156/503 |
| 2,763,910 | 9/1956 | Braatelien | 156/304.2 |
| 3,022,209 | 2/1962 | Campbell | 156/158 |
| 3,865,662 | 2/1975 | Segal | 156/304.6 X |
| 4,050,384 | 9/1977 | Chapman | 118/306 X |
| 4,288,266 | 9/1981 | Konrad et al. | 156/304.2 X |
| 4,292,101 | 9/1981 | Reichert | 156/156 |
| 4,325,772 | 4/1982 | Suetoshi et al. | 156/294 |
| 4,667,594 | 5/1987 | Eddy | 156/423 X |
| 4,758,302 | 7/1988 | Hannover | 156/390 X |
| 4,792,374 | 12/1988 | Rianda | 156/503 |

FOREIGN PATENT DOCUMENTS 3426246 1/1986 Fed. Rep. of Germany ...... 156/156

*Primary Examiner*—Robert A. Dawson
*Assistant Examiner*—Michele K. Yoder
*Attorney, Agent, or Firm*—Toren, McGeady & Associates

[57] ABSTRACT

A device for welding tubular components of thermoplastic material. The device includes a heating device for generating the necessary melting temperature arranged at the circumference and at the abutting ends of the tubular components. The bag or casing is arranged in the region of the welded connection inside the tubular components. The bag or casing is capable of being expanded and pressed against the inner circumference of the tubular components. Pressing the casing against the inner circumference of the tubular components prevents the formation of a welding bead during the welding procedure and serves to generate a welding pressure. After welding has been carried out, the casing is radially contracted and removed from the tubular components.

24 Claims, 3 Drawing Sheets

DEVICE FOR WELDING TUBULAR COMPONENTS OF THERMOPLASTIC MATERIAL

BACKGROUND OF THE INVENTION

1. Field of the Invention

The present invention relates to a device for welding tubular components of thermoplastic material. The device includes a heating device for generating the necessary melting temperature arranged at the circumference and at the abutting ends of the tubular components.

2. Description of the Prior Art

When pipes or tubular components of thermoplastic material are directly welded together by heating the abutting pipe ends at the outer circumference thereof by means of a heating device, a welding bead is formed at the inner circumference of these components. This welding bead decreases the passage area to the pipes and increases the resistance to flow. In addition, since the melt can flow off during welding into the interior of the pipes, a sufficient welding pressure cannot build up, so that the welded connections do not always meet the requirements with respect to strength and tightness.

It is, therefore, the primary object of the present invention to provide a device of the above-described type which ensures a welding free of beads and cavities. Simultaneously, a sufficient welding pressure for obtaining problem-free welded connections is to be built up.

SUMMARY OF THE INVENTION

In accordance with the present invention, a bag or casing is arranged in the region of the welded connection, the bag or casing capable of being expanded and pressed against the inner circumference of the tubular components.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE INVENTION

Figure 1:
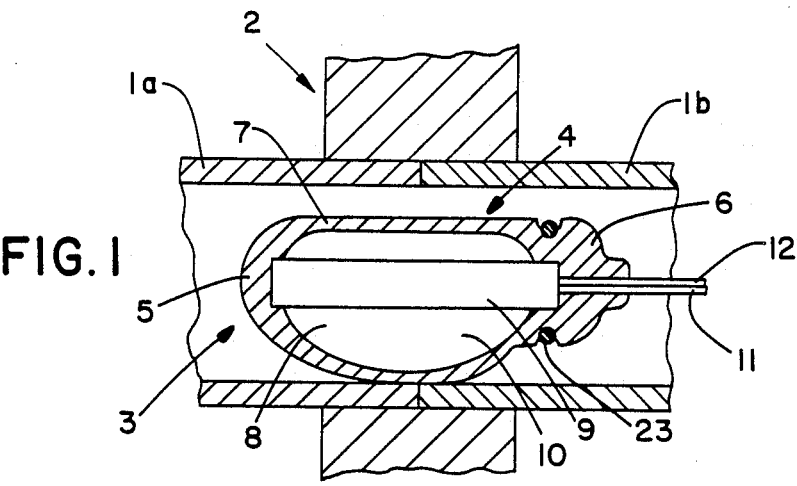
FIG. 1 is a longitudinal sectional view of the device according to the invention, one half of the device being shown with non-expanded casing prior to welding and the other half with expanded casing during welding.

The welding device illustrated in FIG. 1 of the drawing includes a heating device 2 arranged at the outer circumference of the two ends of the tubular components 1a and 1b of thermoplastic material to be welded together and a support device 3 in the form of a casing 4 arranged in the interior of the tubular components 1a, 1b.

The heating device 2 has two heating jaws which brace the two abutting tubular components 1a, 1b. The heating jaws may be heated by electric current, by hot air or by a heated liquid, such as oil.

The support device 3 includes an expandable bag or casing 4 of heat-resisting elastomer or silicone. The casing 4 is oval or oblong and has two rounded-off ends 5,6 and a cylindrical portion 7.

The interior 8 of the casing 4 has an electric heating element 9, such as the heating cartridge illustrated in FIG. 1, and is filled with a thermally expanding liquid 10, such as water or synthetic oil.

The heating element 9 is connected by means of cables 12 to a current source, not illustrated. The cables 12 arranged at the end 6 of the casing 4 simultaneously form a pull strand 11 for pulling the casing 4 out of a pipe line, for example a ring 23 arranged at end 6 may seal the casing 4 to the outside at the cable connection.

Prior to welding, the casing 4 is arranged concentrically at the location to be welded, as can be seen in the upper portion of FIG. 1. Subsequently, the current supply to the heating element 9 of casing 4 is switched on.

The casing 4 then expands due to the increase in volume of the liquid or due to the formation of steam or gas, as shown in the lower portion of FIG. 1. As a result, the cylindrical portion 7 of casing 4 comes into contact with an adjustable pressure against the inner circumference of the tubular components 1a, 1b. The internal pressure of the casing should be adjustable to between 0.5 bar and 5 bar by regulating the current supply. Thus, during the subsequent welding procedure by means of the externally arranged heating device 2, the necessary welding pressure is generated and, simultaneously, the tight contact with the inner circumference prevents the formation of welding beads.

Figure 2:
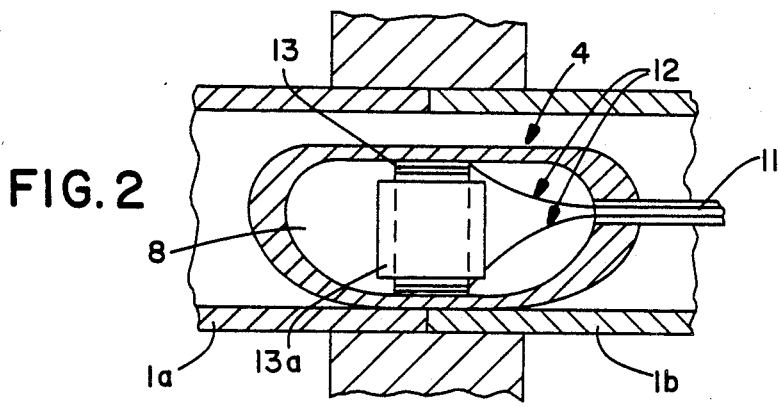
FIG. 2 is a sectional view of a second embodiment of the casing according to the invention.

FIG. 2 of the drawing shows an elastically expandable casing 4 in whose interior 8 is arranged in circumferential direction a current-conducting bimetal support 13 in the form of a spiral spring is arranged, the current being supplied through a cable 12 connected to an external source. When the bimetal support 13 is heated, the diameter of the winding thereof is increased, as shown in the bottom portion of FIG. 2, so that the casing 4 is expanded and rests against the inner circumference of the tubular components 1a, 1b in the welding area. Instead of the current-conducting bimetal support 13, it is also possible to arrange bimetal springs 13 which are formed by means of an additional heating 13a, for example, an electric heating cartridge.

Figure 3:
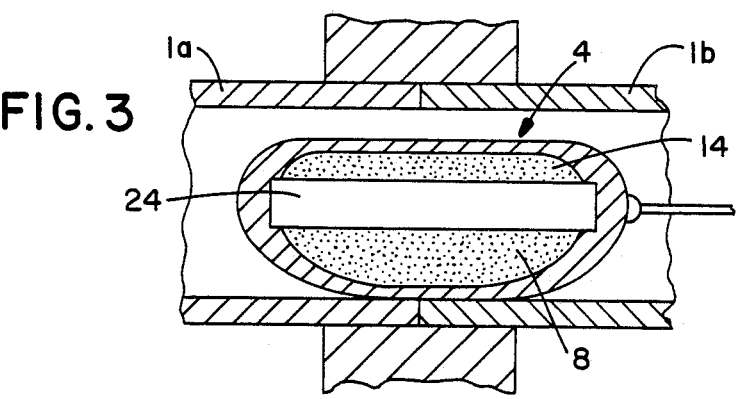
FIG. 3 is a sectional view of a third embodiment of the casing according to the invention.

FIG. 3 shows an embodiment of a casing 4 in whose interior 8 is arranged a magnetizable pulverous or granular material 14, for example, iron powder, or a magnetic liquid 14, such as an oil/iron powder mixture, which surrounds a non-magnetizable core 24. When a magnetic field is generated by a means arranged on the outer circumference of the tubular components 1a, 1b, for example, electromagnets, the iron powder is pulled outwardly and the casing 4 is expanded until it contacts the inner circumference of the tubular components and creates a contact pressure. The magnetic force and, thus, the welding pressure, may be controlled by regulating the current supply of the electromagnet.

Figure 4:
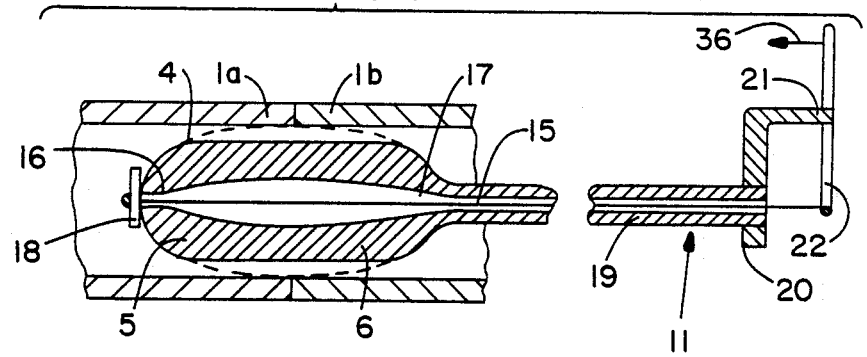
FIG. 4 is a sectional view of a fourth embodiment of the casing according to the invention.

FIG. 4 of the drawing shows a casing 4 which can be expanded by means of a traction cable 15. The casing 4 has at its both ends 5,6 guides 16, 17 for the traction cable 15. A pressure plate 18 is fixedly connected to an end of the traction cable 15 extending out of the end 5 of the casing 4. A pull strand 11 in the form of a hose 19 is fastened to the other end 6 of the casing 4. The traction cable 15 extends out of the ends of the hose 19. A bearing member 20 with a joint 21 is fastened to the end of the hose 19. A lever 22 connected to the traction cable 15 is pivotally mounted on joint 21. The traction cable 15 is pulled out by pivoting the lever 22 in the direction of arrow 36. As a result, the pressure plate 18 is pressed against the end 5 of the casing 4 and the casing is upset so that the circumference of the casing 4 expands and the casing 4 comes into contact with the circumference of the tubular components 1a, 1b. The contact pressure may be adjusted within certain limits by the pivoting angle of lever 22. When the lever 22 is pivoted back, the casing 4 because of its elasticity again assumes it original shape and can be pulled out of the tubular components after they have been welded together.

Figure 5:
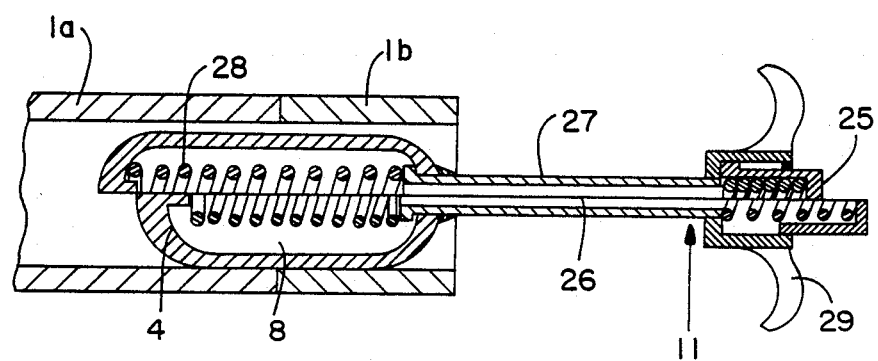
FIG. 5 is a sectional view of a fifth embodiment of the casing according to the invention.

The casing 4 shown in FIG. 5 of the drawing is contracted in longitudinal direction through a pull rope 26 connected to a compression spring 25 arranged at the end of the pull strand 11. As a result, the casing 4 expands during welding and exerts a pressure to the inner circumference of the components 1a, 1b. The pull rope 26 is arranged in a jacket 27 which is connected to the casing 4 and the other end of which has a handle 30.

For inserting and removing the casing 4, the pull rope 26 is untensioned by means of an actuating member 29. A compression spring 28 in the interior of the casing 4 extends the casing 4 and reduces the diameter thereof.

Jacket 27 including handle 30 and pull rope 26 form the pull strand 11 for pulling out the casing 4 from the tubular components.

Figure 6:
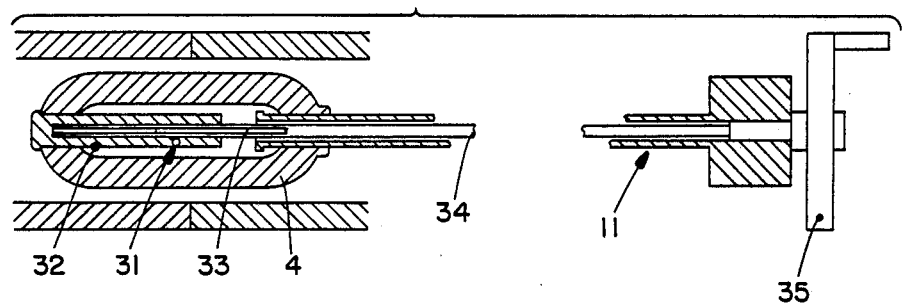
FIG. 6 is a sectional view of a sixth embodiment of the casing according to the invention.
Figure 7A:
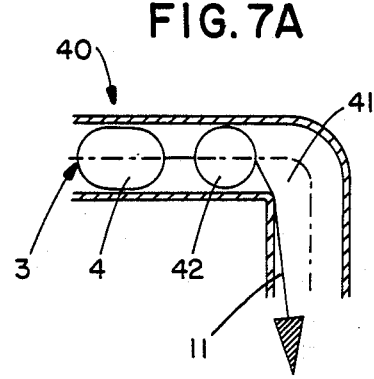
FIGS. 7A–7D schematically illustrate another embodiment of the casing, shown in four stages of removing the casing from a pipe bend.
Figure 7B:
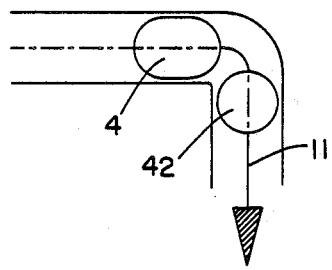
Figure 7C:
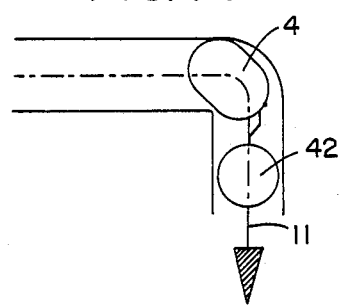
Figure 7D:
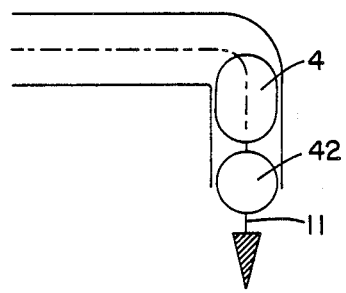

FIG. 6 shows a casing 4 which can be expanded by means of an adjusting spindle 31. The casing 4 includes a threaded bushing 32 integrally formed at one end and a threaded spindle 33 connected to a flexible shaft 34. By turning a handwheel 35, the threaded spindle 33 is screwed through shaft 34 into and out of the threaded bushing 32. This results in an upsetting of the casing 4 and, thus, a radial pressure is exerted to the inner sides of the tubular components 1a, 1b to be welded together. The welding pressure is determined by the radial contact pressure of the casing 4.

If a pipeline system 40 has sharp ends 41, as shown in FIG. 7, the support device 3 may have a spherical guide body 42 attached to the pull strand 11 at a predetermined distance away from the casing 4. As illustrated in FIGS. 7A-7D, the guide body 42 makes it possible to pull the entire support device 3 out of the pipeline 40 which has sharp bends 31, without making it necessary to shrink the casing to a substantially smaller diameter as compared to the inner diameter of the pipes.

While specific embodiments of the invention have been shown and described in detail to illustrate the application of the inventive principles, it will be understood that the invention may be embodied otherwise without departing from such principles.

I claim:

1. An apparatus for welding tubular components of thermoplastic material, the tubular components having an outer circumference and an inner circumference, the tubular components having ends, comprising a heating device for generating the necessary welding temperature, the heating device arranged on the outer circumference of the tubular components at the ends thereof, the apparatus further comprising a casing arranged in the tubular components at the ends thereof, the casing being extendable, the casing having an interior, an electric heating element and a thermally expanding liquid arranged in the interior, whereby the casing is capable of being pressed against the inner circumference of the components when the thermally expanding liquid is heated by the electric heating element, the heating element being connected to a current source by means of cables, wherein the heating element is a heating cartridge.

2. An apparatus for welding tubular components of thermoplastic material, the tubular components having an outer circumference and an inner circumference, the tubular components having ends, comprising a heating device for generating the necessary welding temperature, the heating device arranged on the outer circumference of the tubular components at the ends thereof, the apparatus further comprising a casing arranged in the tubular components at the ends thereof, the casing being extendable, whereby the casing is capable of being pressed against the inner circumference of the components, the casing having an interior, at least one bimetal support means having the shape of a helical spring arranged in the interior, the bimetal support means being radially outwardly deformable when heated by means of a heating means.

3. The apparatus according to claim 2, wherein the heating means is an electric heating cartridge.

4. An apparatus for welding tubular components of thermoplastic material, the tubular components having an outer circumference and an inner circumference, the tubular components having ends, comprising a heating device for generating the necessary welding temperature, the heating device arranged on the outer circumference of the tubular components at the ends thereof, the apparatus further comprising a casing arranged in the tubular components at the ends thereof, the casing being extendable, whereby the casing is capable of being pressed against the inner circumference of the components, the casing having an interior, at least one bimetal spring arranged in the interior, the casing being radially expandable by means of the bimetal spring, the bimetal spring changing its shape when a current is conducted therethrough.

5. An apparatus for welding tubular components of thermoplastic material, the tubular components having an outer circumference and an inner circumference, the tubular components having ends, comprising a heating device for generating the necessary welding temperature, the heating device arranged on the outer circumference of the tubular components at the ends thereof, the apparatus further comprising a casing arranged in the tubular components at the ends thereof, the casing being extendable, whereby the casing is capable of being pressed against the inner circumference of the components, the casing having an interior, a non-magnetizable core and a magnetizable material surrounding the core arranged in the interior, the casing being radially expandable by applying a magnetic field to the outer circumference of the tubular components.

6. The apparatus according to claim 5, wherein the material surrounding the core is pulverous, granular, liquid or paste-like.

7. The apparatus according to claim 5, wherein the material surrounding the core is iron powder.

8. The apparatus according to claim 5, wherein the material surrounding the core is a mixture of iron powder and oil.

9. An apparatus for welding tubular components of thermoplastic material, the tubular components having an outer circumference and an inner circumference, the tubular components having ends, comprising a heating device for generating the necessary welding temperature, the heating device arranged on the outer circumference of the tubular components at the ends thereof, the apparatus further comprising a casing arranged in the tubular components at the ends thereof, the casing being extendable, whereby the casing is capable of being pressed against the inner circumference of the components, the casing having an interior, a non-magnetizable core and a magnetizable material surrounding the core arranged in the interior, the casing being radially expandable by applying a magnetic field to the outer circumference of the tubular components, the casing having an interior, a longitudinally expandable first compression spring arranged in the interior, a pull strand having a first end attached to the first compression spring and a second end, the second end attached to a second compression spring, a pull rope connecting the second compression spring and an end of the casing on the opposite side of the second compression spring, whereby the casing is compressible in longitudinal direction and expandable in radial direction by applying a force to the second compression spring.

10. The apparatus according to claim 1, wherein the casing is of a heat-resistant elastomer or silicone.

11. The apparatus according to claim 1, wherein the casing is of oblong or oval shape, the casing having a cylindrical portion and rounded-off ends, a pull strand being attached to one of the ends.

12. The apparatus according to claim 11, comprising a spherical guide body attached to the pull strand at a predetermined distance from the casing.

13. The apparatus according to claim 2, wherein the casing is of a heat-resistant elastomer or silicone.

14. The apparatus according to claim 2, wherein the casing is of oblong or oval shape, the casing having a cylindrical portion and rounded-off ends, a pull strand being attached to one of the ends.

15. The apparatus according to claim 14, comprising a spherical guide body attached to the pull strand at a predetermined distance from the casing.

16. The apparatus according to claim 4, wherein the casing is of a heat-resistant elastomer or silicone.

17. The apparatus according to claim 4, wherein the casing is of oblong or oval shape, the casing having a cylindrical portion and rounded-off ends, a pull strand being attached to one of the ends.

18. The apparatus according to claim 17, comprising a spherical guide body attached to the pull strand at a predetermined distance from the casing.

19. The apparatus according to claim 5, wherein the casing is of a heat-resistant elastomer or silicone.

20. The apparatus according to claim 5, wherein the casing is of oblong or oval shape, the casing having a cylindrical portion and rounded-off ends, a pull strand being attached to one of the ends.

21. The apparatus according to claim 20, comprising a spherical guide body attached to the pull strand at a predetermined distance from the casing.

22. The apparatus according to claim 9, wherein the casing is of a heat-resistant elastomer or silicone.

23. The apparatus according to claim 9, wherein the casing is of oblong or oval shape, the casing having a cylindrical portion and rounded-off ends, a pull strand being attached to one of the ends.

24. The apparatus according to claim 23, comprising a spherical guide body attached to the pull strand at a predetermined distance from the casing.

* * * * *